United States Patent Office 3,562,229
Patented Feb. 9, 1971

3,562,229
PROCESS FOR THE PREPARATION OF COPOLYMERS FROM ETHYLENE AND VINYL ESTERS
Johann Bauer, Gerhard Beier, and Eduard Bergmeister, Burghausen, Upper Bavaria, Germany, assignors to Wacker-Chemie GmbH, Munich, Germany, a corporation of Germany
No Drawing. Filed Oct. 18, 1968, Ser. No. 768,876
Claims priority, application Germany, Oct. 23, 1967, P 17 45 565.1
Int. Cl. C08f 1/13, 1/62, 15/40
U.S. Cl. 260—80.81
3 Claims

ABSTRACT OF THE DISCLOSURE

This invention relates to a process for the preparation of copolymerizates from ethylene and vinyl esters and possibly other olefinically unsaturated organic compounds in an aqueous emulsion utilizing a redox polymerization catalyst system comprising inorganic and/or organic per-compounds, hydrogen and a colloidally dispersed noble metal of the VIII subgroup of the periodic table wherein the polymerization is conducted at pressures under 100 atmospheres and said vinyl ester is a vinyl ester of a branched chain monocarboxylic acid having at least 9 carbon atoms and is employed in an amount of from 10 mol-percent to 80 mol-percent. The invention also relates to the copolymer so produced which has an excellent cold stability and elasticity.

THE PRIOR ART

For the preparation of vulcanized articles, copolymerizates from ethylene and vinyl esters, e.g., vinyl acetate, as obtained according to known processes, have aroused great interest. Those copolymerizates which are prepared according to known methods possess, however, an insufficient cold stability and elasticity for many fields of application.

Thus, for instance, a vulcanizate prepared from a copolymer of 40% by weight of ethylene and 60% by weight of vinyl acetate has a flex temperature of −25° C. and a rebound elasticity of 20%. In many cases these values are not satisfactory.

According to U.S. Pat. 2,473,996, it was suggested to prepare copolymers from ethylene with vinyl esters of low chained, branched carboxylic acids. In order to obtain products with interesting technical properties according to these processes, the copolymerization had to be carried out at relatively high pressures, for example, over 200 atmospheres and preferably between 800 and 1,300 atmospheres. This requires heavy and costly apparatus. If the process is carried out at lower pressures of under 100 atmospheres, then relatively low molecular weight copolymerizates are obtained having a very small content of polymerized ethylene.

Furthermore, it was recommended according to German Auslegeschrift 1,133,130 to polymerize ethylene with vinyl esters of long chained, carboxylic acids, for example, lauric acid, in aqueous dispersion at temperatures between −80° C. and +50° C. The copolymerization according to this method, however, presents problems such as a too slow reaction speed and strong formation of coagulums. Thus nonhomogenous copolymers result.

OBJECTS OF THE INVENTION

An object of the present invention is the obtention of copolymerizates of ethylene and vinyl esters which on vulcanization have excellent cold stability and elasticity.

Another object of the present invention is the development, in the process for the preparation of copolymerizates from ethylene, vinyl esters and possibly other olefinically unsaturated organic compounds in an aqueous emulsion utilizing a redox polymerization catalyst system comprising (1) an oxidizing agent selected from the group consisting of inorganic per-compounds, organic peroxides and organic hydroperoxides, (2) hydrogen and (3) a colloidally dispersed noble metal of the VIII subgroup of the periodic table, the improvement which comprises conducting the polymerization at pressures of under 100 atmospheres wherein said vinyl ester is a vinyl ester of a branched chained monocarboxylic acid having at least 9 carbon atoms and is employed in an amount of from 10 mol-percent to 80 mol-percent.

These and other objects of the invention will become more apparent as the description thereof proceeds.

DESCRIPTION OF THE INVENTION

Now a method has been discovered for the preparation of copolymers from ethylene and vinyl esters and possibly other olefinic compounds in an aqueous emulsion utilizing a redox polymerization catalyst comprising a combination of inorganic and/or organic per-compounds, hydrogen and colloidally dispersed noble metals of the VIII subgroup of the periodic table. The process is characterized in that the polymerization is carried out at pressures of under 100 atmospheres and in that a vinyl ester of branched chained monocarboxylic acids having at least 9 carbon atoms is used in amounts of 10 to 80 mol-percent.

Among the vinyl esters of branched chain monocarboxylic acids having at least 9 carbon atoms, those having from 9 to 20 carbon atoms in the acid molecule are particularly suitable. These branched chain monocarboxylic acids having from 9 to 20 carbon atoms preferably have the formula

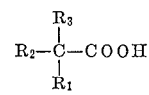

wherein $R_1$ and $R_2$ are members selected from the group consisting of hydrogen, alkyl, cycloalkyl, alkylcycloalkyl, phenyl and phenylalkyl, and, when taken together, alkylene, and $R_3$ is a member selected from the group consisting of hydrogen, alkyl, cycloalkyl, alkylcycloalkyl, phenyl and phenylalkyl, where the total carbon atoms in $R_1$, $R_2$ and $R_3$ is from 7 to 18. Preferably, $R_1$ and $R_2$ are alkyl which may be linear or branched, or cycloalkyl which may be branched and $R_3$ is hydrogen or similar to $R_1$ and $R_2$. Especially preferable are vinyl esters of branched chain alkanoic acids having from 9 to 20 carbon atoms.

Among suitable acids coming under the above formula are those sold under the trademark "Versatic" acids. These acids are saturated synthetic tertiary monocarboxylic acids. "Versatic" 911 acid contains a mixture of acids having $C_9$, $C_{10}$ and $C_{11}$ chain lengths and "Versatic" 1519 acid contains a mixture of acids having $C_{15}$ to $C_{19}$ chain lengths.

Another monocarboxylic acid utilizable for the purposes of preparing the vinyl esters of the invention is the "Isotridecanoic" acid. This acid is a mixture of isomers of highly branched chained alkanoic acids. It consists predominantly of tetramethylnonanoic acid of formula R—$CH_2$—COOH, where R represents an alkyl chain with 7 carbon atoms which is branched with 4 methyl groups in different positions. Isononanoic acid and other such branched chain monocarboxylic acids and mixtures of such acids are also usable.

It is unexpected that upon the use of the vinyl esters of branched chain monocarboxylic acids having at least 9 carbon atoms, homogenous polymerizates result. To the contrary, the copolymerization with ethylene and vinyl laurate which possesses approximately the same number of carbon atoms results in non-homogenous polymerizates. Moreover, the products of the invention exhibit considerably higher molecular weights and better mechanical properties than those prepared from vinyl esters of straight chain acids.

The vinyl esters of branched chain monocarboxylic acids having at least 9 carbon atoms can be polymerized into valuable products, not only with ethylene alone. By means of the addition of other olefinically unsaturated compounds, polymerizable with the aid of free-radical-forming compounds, good ternary copolymerizates are also produced. Preferably, vinyl acetate in amounts of from 2% to 70% are added thereto. However, acrylic acid, methacrylic acid, fumaric acid, maleic acid and the esters of these named acids with alcohols, particularly alkanols having 1 to 18 carbon atoms, as well as hydroxyl group containing compounds, such as acrylates or methacrylates of ethylene glycol, are easily copolymerizable with ethylene and the vinyl esters of the invention.

The process of the invention is carried out at temperatures of between $-80°$ C. and $+50°$ C.

A special advantage of this invention is that ethylene pressures of from 10 to 100 atmospheres already lead to excellent polymerizates whereas according to the process of U.S. Pat. 2,473,996, pressures of between 800 and 1,300 atmospheres are required in order to obtain products with technically interesting properties.

Employed as redox polymerization catalyst systems are combinations of inorganic and/or organic per-compounds, hydrogen and colloidally dispersed noble metals of the VIII subgroup of the periodic table.

Suitable as per-compounds are all inorganic per-compounds which are customarily employed in redox catalyst systems, such as hydrogen peroxide; alkali metal persulfates such as potassium persulfate; ammonium persulfate; alkali metal perborates; alkali metal perphosphates; alkali metal percarbonates; as well as organic per-compounds, particularly organic peroxides and hydroperoxides, such as tertiarybutyl hydroperoxide, cumene hydroperoxide, di-tertiarybutyl hydroperoxide, acetyl peroxide, benzoyl peroxide, lauroyl peroxide and 2,4-dichlorobenzoyl peroxide, as well as symmetrical and asymmetrical dialkyl percarbonates, and acetylcyclohexane sulfonyl peroxide. It is preferable to employ from 0.001% to 2%, particularly 0.001% to 0.5%, by weight, based on the weight of the monomer of the per-compound in the polymerization recipe.

The partial pressure of the hydrogen used according to the invention as a redox catalyst system reducing agent for acceleration of the polymerization is preferably between 0.01 to 100, in particular between 0.1 to 10, atmospheres (absolute).

All noble metals of the subgroup VIII of the periodic system, that is, platinum, palladium, rhodium, ruthenium, osmium, and iridium, may be employed in colloidal form in the process of the invention. It is preferable to utilize them in the form of aqueous sols, the preparation of which is well known. It is advantageous to stabilize the sols against coagulation according to known methods by means of the addition of protective colloidals, such as gelatins, gum arabic, polyvinyl alcohol, sodium albuminate, sodium alginate, etc. For economical reasons and due to its excellent catalytic properties, palladium sol is preferable. The noble metal is preferably employed in an amount of between 0.000001% and 0.1% by weight, especially between 0.00001% and 0.001% by weight, based on the weight of the monomers in the polymerization recipe.

In addition to the above-named redox polymerization catalyst systems, highly sensitive catalysts can be used as well, for instance, those which are called "fast catalysts," for example, acetylcyclohexane sulfonyl peroxide, tertiary butyl perpivalate, isopropyl percarbonate and similar compounds of this group.

As dispersing agents, all emulsifiers, either anion active, cation active or nonionic, and protective colloids which are customarily employed for polymerization of unsaturated organic compounds in aqueous dispersions may be used, either alone or in admixture with each other. Anion active emulsifiers are preferred.

Examples of such anionic active emulsifiers are the following: alkali metal salts, especially the sodium and potassium as well as ammonium salts of long chain fatty acids, such as lauric acid and stearic acid; of unsaturated long chain fatty acids, such as oleic acid; of resin acids, such as abietic acid; of acid phosphoric acid esters with long chain alkanols, such as diethylhexyl sodium phosphate; of acid fatty alcohol sulfuric acid esters; of paraffin sulfonic acids, such as those which are on the market under the trademark "Mersolate," of alkyl benzene or alkyl naphthalene sulfonic acids; and of sulfosuccinic acid dialkyl esters.

Cationic emulsifiers may also be used, such as dodecyltrimethyl-ammonium bromide and amphoteric emulsifiers such as dodecyl betaine.

Examples of nonionic emulsifiers which may be used are the following: partial fatty acid esters of polyhydroxy alcohols, such as glycerin-monostearate, sorbitol-monolaurate and sorbitol-monopalmitate; partial ethers of long chain alkanols and polyhydroxyalcohols; polyoxyethylene ethers of fatty alcohols or aromatic hydroxy compounds; polyoxyethylene esters of fatty acids; as well as polypropylene oxide-polyethylene oxide condensation products known in commerce under the tradename "Pluronics."

Examples of protective colloids which may be used are the following: polyvinyl alcohol which may contain up to 40 mol-percent of acetyl groups; gelatins; gum arabic; cellulose derivatives, such as water-soluble methyl cellulose, carboxymethyl cellulose, hydroxyethyl cellulose, hydroxymethyl cellulose; starch; polyvinyl pyrrolidone; salts of polyacrylic acids and alginic acid; water-soluble polyacrylamides; as well as copolymers of maleic acid or its hemiesters with vinyl compounds.

As is generally customary with polymerizations in aqueous dispersion, the amount of the ionic and nonionic emulsifiers is about 0.1% to 2% by weight, and the amount of the protective colloids is about 0.1% to 5% by weight, preferably 0.3% to 2% by weight.

The polymerization according to the process of the invention may be performed continuously or by batch methods.

The polymerizate dispersions obtained thereby may be worked up according to known methods, such as by filtration, coagulation, spray drying or roller drying. The platinum metals which may possibly remain in the polymerizate do not in any way interfere with the properties of the products obtained thereby because of their low reactivity and because of their extremely low concentrations. Moreover, they cause no discoloration of the polymerizates obtained.

The copolymers prepared according to the process of the invention possess interesting technical properties. A vulcanized molded article consisting of 33% by weight (80 mol-percent) of ethylene and 67% by weight (20 mol-percent) of the vinyl ester of "Versatic" 911 acid (with 9 to 11 carbon atoms) has a flex temperature of $-55°$ C. and a rebound elasticity of 40%. A vulcanizate of a ternary copolymer consisting of 30% by weight of vinyl acetate, 30% by weight of the vinyl ester of "Versatic" 911 acid (with 9 to 11 carbon atoms) and 40% by weight of ethylene has a flex temperature of $-45°$ C. and a rebound elasticity of 50%.

The products can be individually cross-linked peroxidically according to known methods into rubber-like articles with interesting technical properties. In addition, they can be employed in a mixture with other elastomers such as natural rubber, styrene-butadiene rubbers, acrylonitrile-butadiene-styrene types, ethylene-propylene copolymers, polybutadiene, and others.

Products such as molded articles, coated wires and cables, hot water-resistant packings, oil-resistant hoses and the like can preferably be prepared from the copolymerizates of the invention. As a result of the good elastic behavior at low temperatures and the good compatibility with polyvinyl chloride, the copolymerizates of the invention can be employed to improve the cold impact strength of polyvinyl chloride as well.

The following examples illustrate the practice of the invention. They, however, are not to be deemed limitative of the invention in any manner.

The parts indicated in the examples are always parts by weight.

EXAMPLE 1

140 parts of water, 20 parts of methanol, 1.2 parts of methyl cellulose, 1 part of an alkylbenzene sulfonate, 0.5 part of ammonium persulfate, 0.0002 part of colloidal palladium were admixed in a stirrer autoclave. The pH value of the admixture was adjusted to approximately 3 with the aid of dilute hydrochloric acid. Then, the autoclave was evacuated and 60 parts of the vinyl ester of "Versatic" 911 acid (a saturated synthetic tertiary monocarboxylic acid having $C_9$, $C_{10}$ and $C_{11}$ chain length) was pumped into this admixture. At a temperature of $+10°$ C. approximately 60 parts of ethylene were pumped therein whereupon a pressure of approximately 40 atmospheres resulted. Subsequently, approximately 1 atmosphere excess pressure of hydrogen was charged. During the polymerization, the temperature was maintained at approximately $+10°$ C. The pressure varied between 35 to 40 atmospheres. After 20 hours the polymerization was interrupted and the unreacted ethylene was distilled off. A stable, coagulant-free dispersion with a solids content of 39% was obtained. On coagulation of the emulsion, 90 parts of a rubber-like product were obtained. The copolymer had a K-value (according to Fikentscher) of approximately 78, a melting index ($i5$) of 3.7 and contained 33% by weight (80 mol-percent) of ethylene.

EXAMPLE 2

A polymerization recipe in accordance with claim 1, however with 40 parts of ethylene to 60 parts of the vinyl ester of "Versatic" 911 acid was polymerized with stirring at $+25°$ C. and under a pressure of 40 atmospheres. After 15 hours, the polymerization was finished. A rubber-like copolymer with a K-value of 70 and an ethylene content of 25% by weight (72 mol-percent) was obtained.

EXAMPLE 3

A polymerization recipe in accordance with Example 1, however with vinyl laurate instead of the vinyl ester of "Versatic" 911 acid, was polymerized under the conditions of Example 1 for 80 hours. Thereafter the polymerization was stopped. The contents of the autoclave, for the most part, consisted of a sticky coagulate. After working up a sticky, viscous substance with a K-value of 40 resulted which had an ethylene content of 35% by weight.

This shows that vinyl laurate does not lead to suitable copolymers although it contains approximately the same number of carbon atoms as does the branched vinyl ester employed according to the invention.

EXAMPLE 4

A polymerization recipe in accordance with Example 1, however with 30 parts of vinyl acetate, 30 parts of the vinyl ester of "Versatic" 911 acid and 60 parts of ethylene, was polymerized for 16 hours at $+15°$ C. After working up, a rubber-like copolymerizate was obtained which had the following properties:

K-value=75
Melting index ($i5$)=0.9
Flex temperature (of the vulcanizate)=$-45°$ C.

Composition

40% by weight of ethylene
30% by weight of vinyl acetate
30% by weight of the vinyl ester of "Versatic" 911 acid.

EXAMPLE 5

A polymerization recipe in accordance with Example 1, however with 60 parts of the vinyl ester of "Versatic" 1519 acid (a saturated tertiary monocarboxylic acid having $C_{15}$ to $C_{19}$ chain length), and 40 parts of ethylene, was polymerized for 18 hours at $+15°$ C. After working up, a soft, rubber-like copolymerizate was obtained with a melting index ($i2$) of 6.7 and an ethylene content of 70 mol-percent.

EXAMPLE 6

A polymerization recipe in accordance with Example 1, however with 60 parts of the vinyl ester of isononanoic acid and 50 parts of ethylene, was polymerized for 15 hours at $+15°$ C. After working up, a rubber-like copolymerizate was obtained with a K-value of 80 and an ethylene content of 78 mol-percent.

The preceding specific embodiments are illustrative of the practice of the invention. It is to be understood, however, that other expedients known to those skilled in the art may be employed without departing from the spirit of the invention.

We claim:

1. In the process for the production of copolymerizates containing from 20 mol-percent to 90 mol-percent of ethylene, from ethylene, vinyl esters and from 0 to 70% by weight of vinyl acetate in an aqueous emulsion utilizing a redox polymerization catalyst system comprising (1) an oxidizing agent selected from the group consisting of inorganic per-compounds, organic peroxides and organic hydroperoxides, (2) hydrogen and (3) a colloidally dispersed noble metal of the VIII subgroup of the periodic table, the improvement which comprises conducting the polymerization at pressures of under 100 atmospheres wherein said vinyl ester is a vinyl ester of a branched chain alkanoic acid having from 9 to 20 carbon atoms and is employed in an amount of from 10 mol-percent to 80 mol-percent.

2. The process as defined in claim 1 wherein said redox polymerization catalyst system includes "fast catalysts" selected from the group consisting of acetylcyclohexane sulfone peroxide, tert.-butyl perpivalate and isopropyl percarbonate, in addition.

3. The process as defined in any one of claims 1 and 2 wherein a content of from 2% to 70% by weight of the monomers of vinyl acetate is included as a third monomer component of the polymerization recipe.

References Cited

UNITED STATES PATENTS

| | | | |
|---|---|---|---|
| 2,310,780 | 2/1943 | Hanford et al. | 260—73 |
| 2,473,996 | 6/1949 | Hanford et al. | 260—87.3 |
| 3,186,974 | 6/1965 | Verberg | 260—85.7 |
| 3,145,194 | 8/1964 | Heckmaier et al. | 260—79.3 |
| 3,394,114 | 7/1968 | Anderson | 260—87.3 |

JAMES A. SEIDLECK, Primary Examiner

J. KIGHT III, Assistant Examiner

U.S. Cl. X.R.

117—128.4; 260—4, 78.5, 80.8, 87.3, 889, 897, 899